(No Model.)
H. Y. CASTNER.
PROCESS OF PURIFYING ALUMINIUM CHLORIDE.
No. 422,500. Patented Mar. 4, 1890.
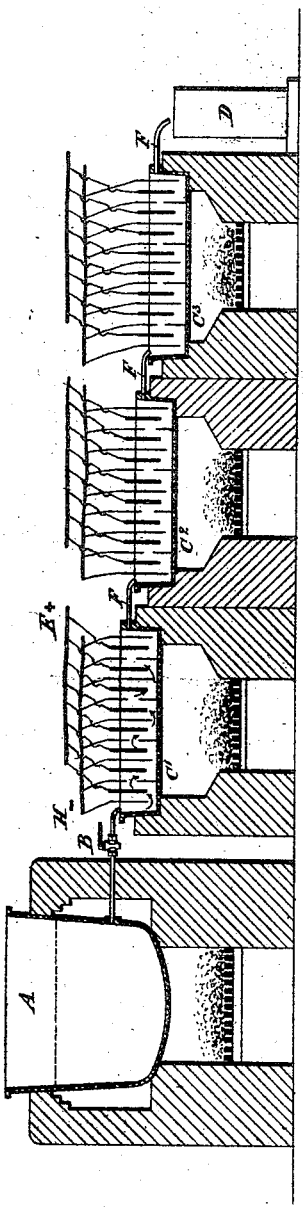
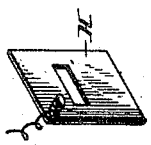
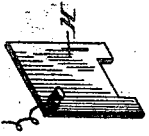
Witnesses.
Inventor.

UNITED STATES PATENT OFFICE.

HAMILTON YOUNG CASTNER, OF LONDON, ENGLAND.

PROCESS OF PURIFYING ALUMINIUM CHLORIDE.

SPECIFICATION forming part of Letters Patent No. 422,500, dated March 4, 1890.

Application filed November 26, 1889. Serial No. 331,591. (No model.)

*To all whom it may concern:*

Be it known that I, HAMILTON YOUNG CAST-NER, a citizen of the United States of America, residing at 115 Cannon Street, in the city of London, England, have invented a certain new and useful Improved Process of Purifying the Anhydrous Double-Chloride Compounds of Aluminium; and I do hereby declare that the following is a full, clear, and exact description of the invention, which will enable others skilled in the art to which it appertains to make and use the same.

The object of this invention is to purify the anhydrous double chloride compounds of aluminium.

Although reference is only made herein to the double chloride of aluminium and sodium, it will be evident that the process is equally applicable to other double-chloride compounds of aluminium—such, for instance, as the double chloride of aluminium and potassium. In the production of metallic aluminium from the double chloride (by the action of sodium or otherwise) it is of great importance that this compound should be pure.

The double chloride of aluminium and sodium is now generally manufactured by passing chlorine gas over or through a highly-heated mixture of alumina carbon and salt contained in fire-clay retorts, the double chloride formed by reaction being distilled and condensed in receivers attached to the said retorts through which the vapors are made to pass. In manufacturing the double chloride in this manner it becomes much contaminated with ferrous and ferric chloride, produced by the action of the chlorine gas and carbon monoxide upon the iron contained in the materials composing the charge, and also contained in the fire-clay of which the retorts are composed. In the subsequent treatment of this impure double chloride with sodium for the production of aluminium both the chlorides of aluminium and iron are reduced to the metallic state, yielding an aluminium of inferior quality, due to the presence of iron, the proportion of the same in the aluminium produced depending upon the quantity of iron contained in the crude chloride employed.

My present invention relates to a method of purifying the anhydrous double chlorides by the use of an electric current, the apparatus being so arranged and the quantity of current being so regulated and applied in such a manner as will only decompose the ferrous and ferric chlorides, causing metallic iron to be deposited and leaving the double chloride of aluminium and sodium pure.

In order that my invention may be clearly understood, I take the following as an example of how my invention may be practically employed.

Let it be assumed that I desire to treat an impure double chloride of aluminium and sodium containing .5 (one-half of one) per cent. of iron in the form of ferrous and ferric chlorides and have a current of one thousand ampères with which to carry out the purification. One thousand ampères of current passed into molten crude chloride will decompose and precipitate about seven hundred grams of iron per hour from the equivalent amount of ferric chloride, which is about the amount of iron contained in three hundred and ten pounds of crude chloride containing .5 (one-half of one) per cent. of iron.

My experiments have proven that if the one thousand ampères were continuously passed through the crude double chloride in a single bath and no means were taken to keep the electrolyte in motion there would be a greater or less deposit of metallic aluminium with and among the iron deposited on the negative electrodes, and to prevent this and to accomplish the separation with little or no waste of either material or current I propose to purify the crude chloride gradually by treating it while in motion in a series of baths to a series of electric currents of decreasing quantity. A convenient arrangement of apparatus for this purpose is indicated in the accompanying drawings, in which—

Figure 1 is a view in section. Fig. 2 is a perspective view of one of the metal plates used as a negative electrode alternately in the decomposing-cells with the plate, as shown in Fig. 3, also as a negative electrode.

The vessel A serves for melting the crude chloride (being set in brick-work over a small fire-place) and is provided with a tap B, by means of which the quantity of molten chloride flowing into tank C' can be regulated.

Tank C' is a long narrow iron vessel (preferably porcelain-lined) fitted with a series of electrodes so arranged that the molten chloride will flow in a regular manner between the plates forming these electrodes. This end may be attained by arranging the plates as follows: The anodes E (which are preferably of carbon) are of such a size that when fixed in place they do not either extend to the bottom or sides of the bath. The cathodes H (which are of metal, preferably of sheet-aluminium, about one-sixteenth inch or one-eighth inch thick) are of the shape shown in Figs. 2 and 3. These plates are of the same width as the bath, and when placed in position between the carbon anodes cause the chloride flowing from A to take the direction shown by the arrows. The tanks C² and C³ are similarly fitted, and are each provided with overflow or discharge pipes F, the last named discharging into the receptacle D for the purified material. The vessel A and tanks C', C², and C³ are sufficiently heated to keep the chloride just melted, so that it may run freely. The anodes and cathodes in each bath are so connected with the poles of the dynamo that the one thousand ampères of current used are divided, so that, say, about six hundred pass through the moving electrolyte in tank C' per hour, three hundred through that in C² per hour, and one hundred through that in C³ per hour. If, therefore, the tap B is set so that the three hundred and ten pounds of impure chloride are passed from vessel A to tank C' per hour and there submitted to a current of six hundred ampères, four hundred and twenty grams of iron out of the seven hundred contained therein will be deposited on the cathodes, together with a quantity of salt (NaCl) from the double chloride. In passing through the tank C² the partially-purified chloride is submitted to a further current of three hundred ampères, a further quantity of two hundred and ten grams of iron being in like manner deposited, while in flowing through tank C³ the remaining seventy grams will be eliminated by the one hundred ampères of current, and the material flowing into receptacle D will be found to be practically pure. If, therefore, the vessel A be kept duly charged with the impure chloride containing .5 (one-half of one) per cent. of iron and the tap B be set to allow a flow of three hundred and ten pounds to pass into tank C' hourly and submitting it to the action of the current, as mentioned, during its passage to D, a continuous process of purification will be obtained, it being only necessary to remove the cathodes from time to time and substitute clean ones, while those removed are cleansed from the adhering iron and salt together with a little double chloride and with a very small amount of metallic aluminium, which has been deposited owing to a small proportion of the double chloride of aluminium and sodium having been decomposed.

The anodes, if made of carbon, are of course gradually disintegrated by the chlorine, and require to be removed from time to time and new ones substituted.

I do not, of course, confine my process to the treatment of double chlorides containing .5 (one-half of one) per cent. of iron, or to a current of one thousand ampères, as these quantities have simply been assumed for the purpose of illustration; nor do I confine myself to the particular form or number of baths, as the operation might be conducted in a single bath if due care were taken to diminish the current at successive stages of the operation in the manner indicated herein, the molten crude or partially-purified double chloride being kept in motion throughout the operation.

I am aware that iron has heretofore been separated from its solutions by electrolysis, and such process I do not claim, broadly.

Having now particularly described and ascertained the nature of my said invention and in what manner the same is to be performed, I declare that what I claim is—

1. The process of purifying the anhydrous double-chloride compounds of aluminium containing iron, which consists in removing said iron from such compounds when in motion and in a fused condition by electrolysis, substantially as set forth.

2. The process of purifying the anhydrous double-chloride compounds of aluminium containing iron, which consists in first melting the crude material and then causing it to pass through a series of receptacles in which it is subjected while in motion to the action of electric currents, substantially as set forth, by which the iron chlorides are decomposed and the metallic iron deposited.

3. The process of purifying the anhydrous double-chloride compounds of aluminium containing iron, which consists in treating the crude material when in motion and in a fused condition to an electric current of gradually-decreasing quantity proportioned to the gradually-decreasing quantity of iron contained in the material, substantially as and for the purpose set forth.

In testimony whereof I have hereunto set my hand in the presence of two subscribing witnesses.

HAMILTON YOUNG CASTNER.

Witnesses:
   ALLEN P. JONES,
   HORATIO A. LEE.